United States Patent
Ganz et al.

(10) Patent No.: US 9,569,954 B2
(45) Date of Patent: Feb. 14, 2017

(54) METHOD AND SYSTEM FOR CONTROLLING A VEHICLE WITH A SMARTPHONE

(71) Applicants: Brian L. Ganz, Carlsbad, CA (US); Benjamin Mike Liedblad, Carlsbad, CA (US); Henry Thiemann, Carlsbad, CA (US)

(72) Inventors: Brian L. Ganz, Carlsbad, CA (US); Benjamin Mike Liedblad, Carlsbad, CA (US); Henry Thiemann, Carlsbad, CA (US)

( * ) Notice: Subject to any disclaimer, the term of this patent is extended or adjusted under 35 U.S.C. 154(b) by 0 days.

(21) Appl. No.: 14/106,104

(22) Filed: Dec. 13, 2013

(65) Prior Publication Data

US 2014/0172197 A1    Jun. 19, 2014

Related U.S. Application Data

(60) Provisional application No. 61/737,009, filed on Dec. 13, 2012.

(51) Int. Cl.
G08C 17/02 (2006.01)
(52) U.S. Cl.
CPC .......... *G08C 17/02* (2013.01); *G08C 2201/51* (2013.01); *G08C 2201/93* (2013.01)
(58) Field of Classification Search
CPC .... G08C 17/02; G08C 2201/51; G08C 201/93
USPC ......... 701/1, 2, 31.4, 93, 300, 472; 340/441, 340/901
See application file for complete search history.

(56) References Cited

U.S. PATENT DOCUMENTS

| | | | |
|---|---|---|---|
| 8,306,267 B1* | 11/2012 | Gossweiler et al. .......... | 382/103 |
| 2001/0022818 A1* | 9/2001 | Nagata .................... | E02F 9/205 375/259 |
| 2003/0055545 A1* | 3/2003 | Uenuma et al. ................ | 701/41 |
| 2004/0133319 A1* | 7/2004 | Pillar et al. .................... | 701/29 |
| 2005/0124234 A1* | 6/2005 | Sells et al. ...................... | 440/33 |
| 2006/0235615 A1* | 10/2006 | Kato et al. .................... | 701/300 |
| 2008/0243350 A1* | 10/2008 | Harkness ........................ | 701/93 |
| 2008/0274769 A1* | 11/2008 | Linden ....................... | 455/556.1 |
| 2009/0093984 A1* | 4/2009 | Choi et al. .................... | 702/104 |
| 2009/0228166 A1* | 9/2009 | Durkos et al. ................. | 701/26 |
| 2009/0239587 A1* | 9/2009 | Negron et al. ............... | 455/566 |
| 2013/0261895 A1* | 10/2013 | Dabbs et al. .................. | 701/41 |

\* cited by examiner

*Primary Examiner* — Redhwan k Mawari
*Assistant Examiner* — Rodney P King
(74) *Attorney, Agent, or Firm* — John R. Ross; John R. Ross, III

(57) ABSTRACT

A remote control system for controlling a vehicle with a smart phone. The system includes the smart phone programmed with an application that can be installed in the phone via a computer or downloaded from the Internet. The system also includes the vehicle that has been equipped with a radio antenna adapted for communication with the smart phone, an electric power source, servo controller drive motor and a programmable microcontroller (including sensors) and a servo controller steering motor.

14 Claims, 7 Drawing Sheets

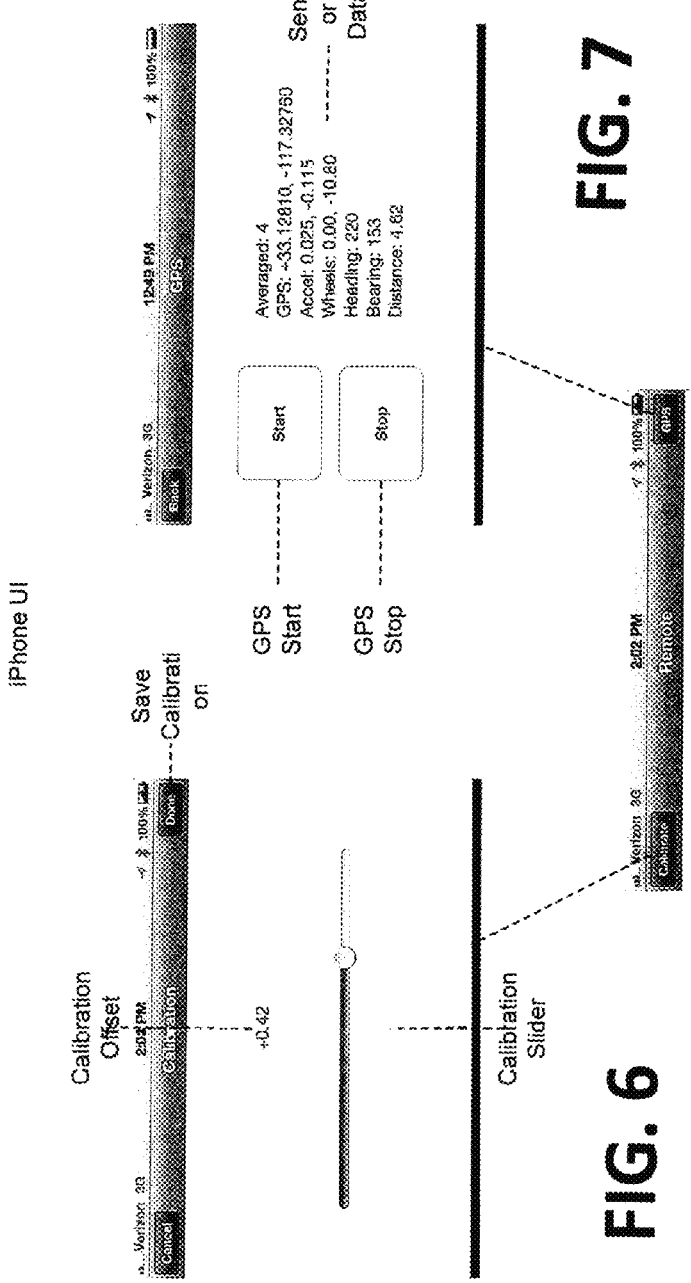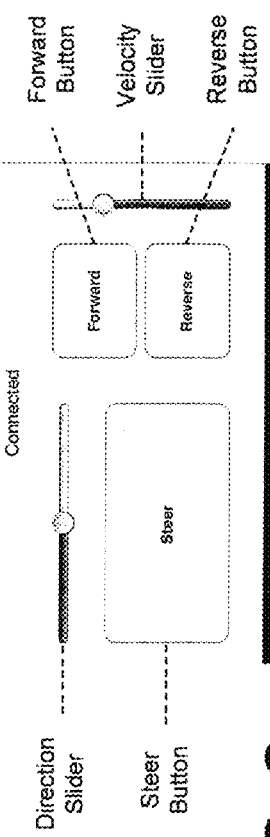

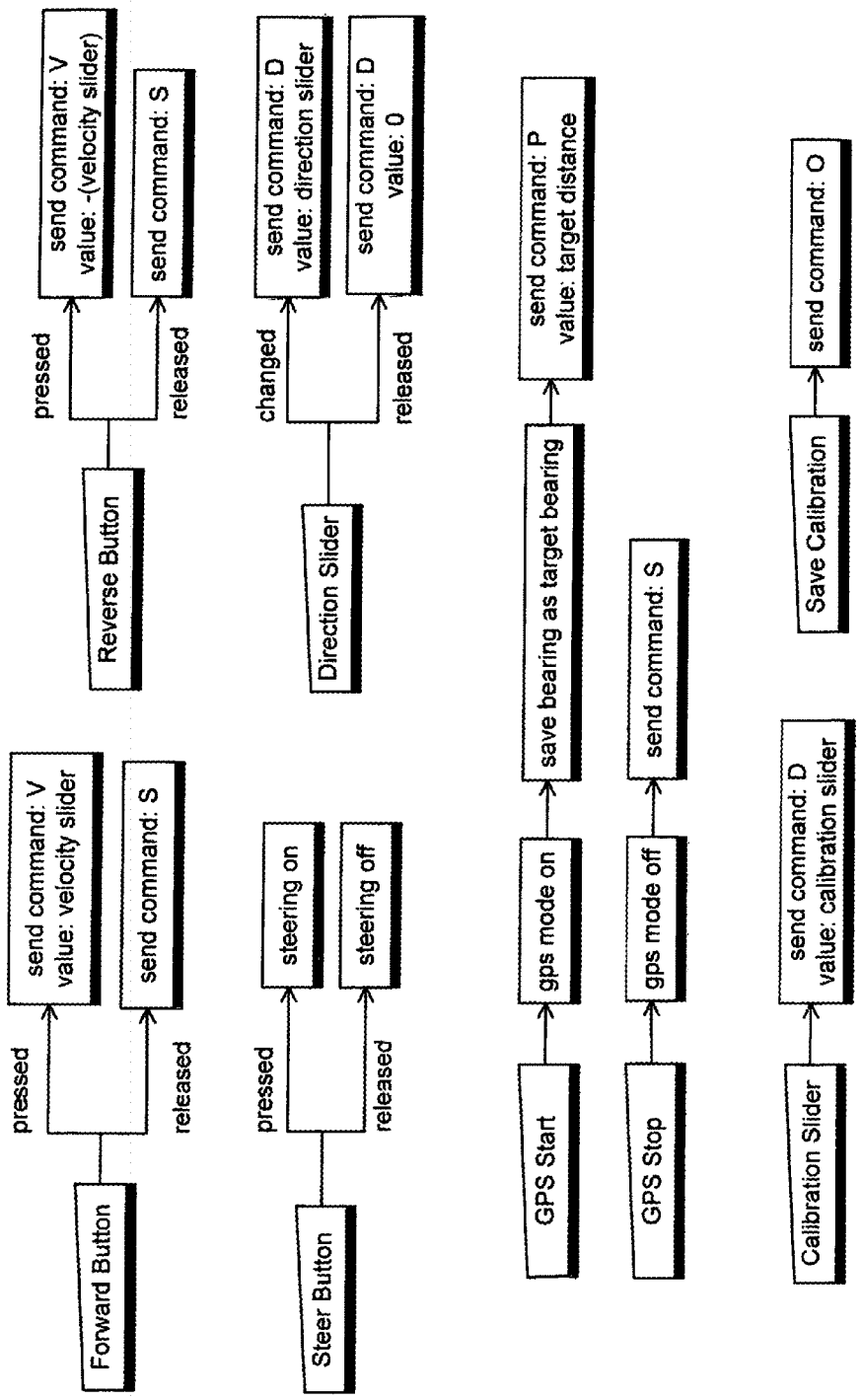

METHOD AND SYSTEM FOR CONTROLLING A VEHICLE WITH A SMARTPHONE

CROSS REFERENCE TO RELATED APPLICATIONS

This application claims the benefit of provisional application Ser. No. 61/737,009 filed Dec. 13, 2012 by the present inventors.

BACKGROUND OF THE INVENTION

Radio Controlled Vehicles

Radio controlled vehicles are well known, especially for toy models of automobiles airplanes, boats and helicopters. Examples are a toy motorcycle U.S. Pat. No. 5,709,583 and a motor vehicle Patent No. 4213, 270 both of which are incorporated herein by reference.

Arduino® Programmable Microcontrollers

Arduino® programmable microcontrollers are known in the prior art. Arduino® is a registered trademark of Arduino, LLC and refers in general to microcontrollers and microcontroller modules. The Arduino® programmable microcontroller is an open-source electronics prototyping platform based on flexible, easy-to-use hardware and software.

The Arduino® programmable microcontroller hardware includes an open-source circuit board with a microprocessor and input/output (I/O) pins for communication and controlling physical objects (LED, servos, buttons, etc.). The board will typically be powered via USB or an external power supply which in turn allows it to power other hardware and sensors.

The Arduino® programmable microcontroller also has an open-source software component which is similar to C++. The Arduino® programmable microcontroller integrated development environment (IDE) allows code to be written, compiled, and uploaded to the Arduino® programmable microcontroller for stand alone use in prototyping and projects.

The Arduino® programmable microcontroller is intended to be relatively easy to use to let artists, designers, inventors, and makers freely develop their ideas into real objects.

Arduino Uno Microcontroller

The Arduino Uno has 14 digital input/output pins (of which 6 can be used as PWM outputs), 6 analog inputs, a 16 MHz ceramic resonator, a USB connection, a power jack, an ICSP header, and a reset button. It contains everything needed to support the microcontroller; simply connect it to a computer with a USB cable or power it with a AC-to-DC adapter or battery to get started.

Smartphones

A smartphone is a mobile phone built on a mobile operating system, with more advanced computing capability and connectivity than a feature phone. Recent models have added the functionality of portable media players, low-end compact digital cameras, pocket video cameras, and GPS navigation units to form one multi-use device. Many modern smartphones also include high-resolution touchscreens and web browsers that display standard web pages as well as mobile-optimized sites. The mobile operating systems used by modern smartphones include Google's Android, Apple's iOS, Symbian, Blackberry Ltd's BlackBerry 10, Samsung's Bada, Microsoft's Windows Phone, Hewlett-Packard's webOS, and embedded Linux distributions such as Maemo and MeeGo. Such operating systems can be installed on many different phone models, and typically each device can receive multiple OS software updates over its lifetime.

Mobile Applications

A Mobile application (also commonly known as Mobile App or an App) is a piece of software installed on a computing device. A mobile app is usually run on a smartphone or other mobile electronic device. It is also possible to run an app on a more stationary type device such as a desktop or laptop computer. The currently popular iPhone smart phone is equipped with a GPS system, a compass and an accelerometer. iPhone is a registered trademark of Apple, Inc. Tools are available from Apple to prepare applications providing remote control of systems and devices via the Internet and WiFi, cellular systems and other wireless communication networks.

Ad Hoc Wi-Fi Networks

An ad hoc Wi-Fi network is a type of temporary computer-to-computer connection. In ad hoc mode, a wireless connection is set up directly to another computer without having to connect to a wireless access point or router.

SUMMARY OF THE INVENTION

The present invention provides a remote control system for controlling a vehicle with a smart phone. The system includes the smart phone programmed with an application that can be installed in the phone via a computer or downloaded from the Internet. The system also includes the vehicle that has been equipped with a radio antenna adapted for communication with the smart phone, an electric power source, drive motor and a programmable microcontroller (including sensors) and a steering motor.

A preferred embodiment is remote control system for controlling a vehicle with a smart phone programmed with an application adapted to communicate with a programmable microcontroller located on the vehicle to receive sensor data from the programmable microcontroller defining speed and steering direction of the vehicle and transmit control signals to the programmable microcontroller for controlling the speed and steering direction of the vehicle. The vehicle includes a radio antenna adapted for communication with the smart phone, compass unit, a GPS unit, an electric power source, a servo controlled drive motor, a programmable microcontroller (including sensors) and a servo controlled steering motor.

BRIEF DESCRIPTION OF THE DRAWINGS

FIGS. 6-8 show preferred user interface display screens.
FIG. 9 shows a preferred user interface flowchart.

DETAILED DESCRIPTION OF PREFERRED EMBODIMENTS

The present invention provides a method and system for remotely controlling a vehicle via a smartphone over a wireless connection. In a preferred embodiment the processing power of the smartphone is utilized to direct a vehicle utilizing sensor data sent from the on-board microcontroller to the smart phone.

Figure 1:
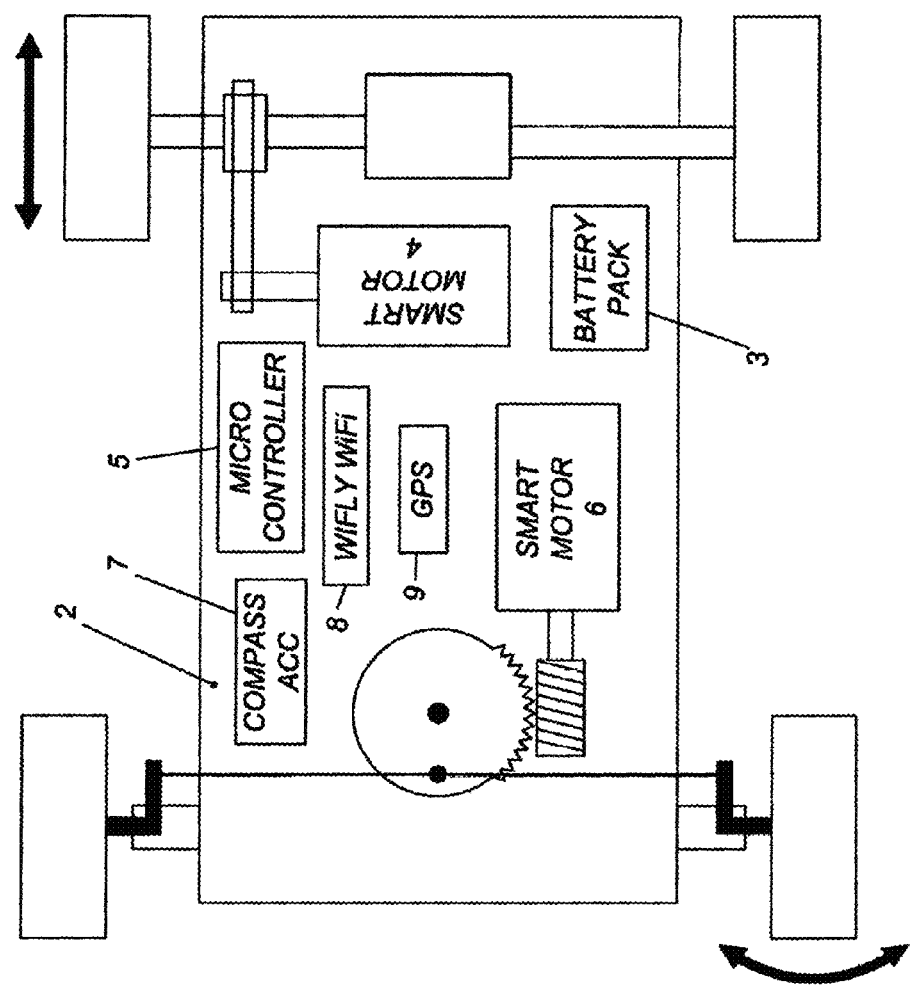
FIG. 1 shows a preferred embodiment of the present invention.

For example, FIG. 1 shows remotely controllable vehicle 1. In a preferred embodiment, vehicle 1 includes WiFi antenna 2, battery pack 3, servo controller drive motor 4, programmable microcontroller 5 (including sensors), and servo controller steering motor 6. In a preferred embodiment programmable microcontroller 5 is an Arduino® Uno programmable microcontroller.

Figure 2:
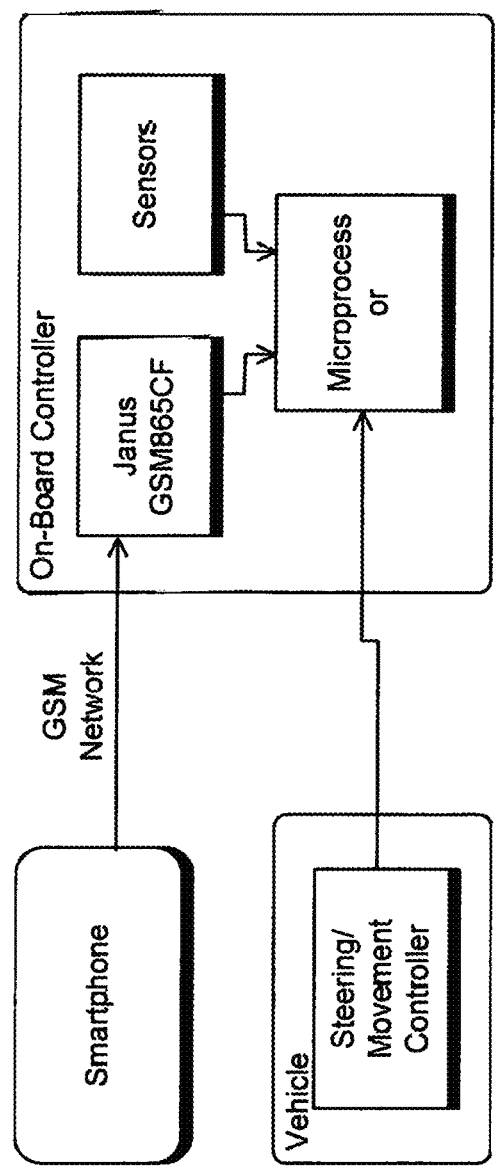
FIG. 2 shows another preferred embodiment of the present invention.

In a preferred embodiment, vehicle 1 also includes compass/accelerometer 7, WiFi networking module 8, and GPS module 9. The WiFi unit is WiFly Shield WRL-09954 available from Sparkfun. The GPS unit is GPS shield Retail Kit RTL-10709 and the compass/accelerometer unit is a 9 degrees freedom MPU Sen-11486 also available from Sparkfun Electronics with offices in Boulder, Colo. (FIG. 2 shows another preferred embodiment. In this embodiment cellular GMS network 13 is utilized instead of WiFi to allow for much greater range in the control of vehicle 1.)

Hardware Control Architecture

Figure 3:
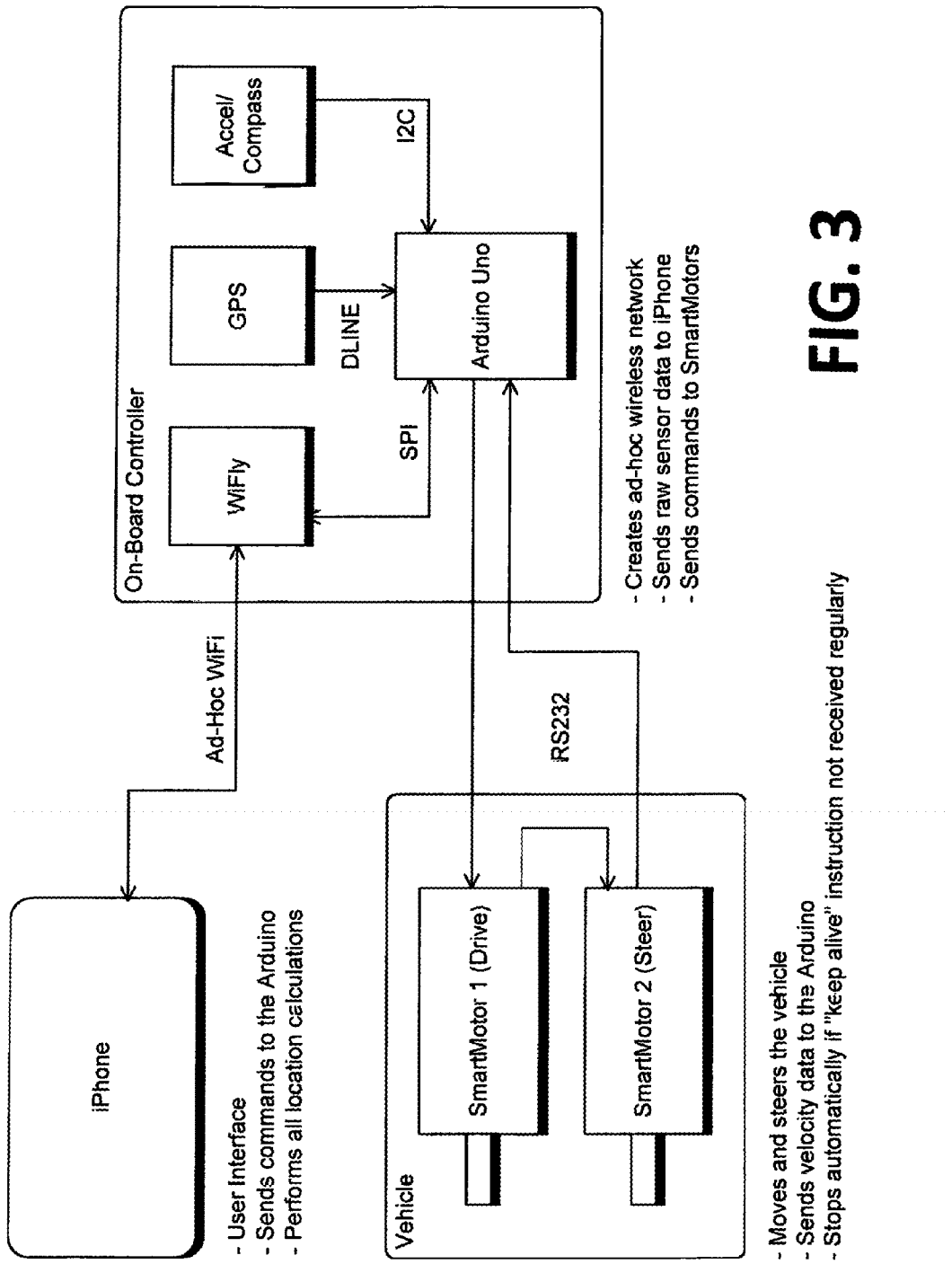
FIG. 3 shows a preferred hardware control architecture.

FIG. 3 shows a preferred hardware control architecture utilized for control of vehicle 1. Smartphone 10 an iPhone available from Apple and it is in communication remotely with vehicle 1 via a wireless connection through networking module 8. Microcontroller 5 receives sensor inputs from networking module 8, GPS module 9, and accelerator/compass sensor 7. Microcontroller sends control signals to servo controlled drive motor 4 and servo controlled steering motor 6.

Microcontroller Software Flowchart

Figure 4:
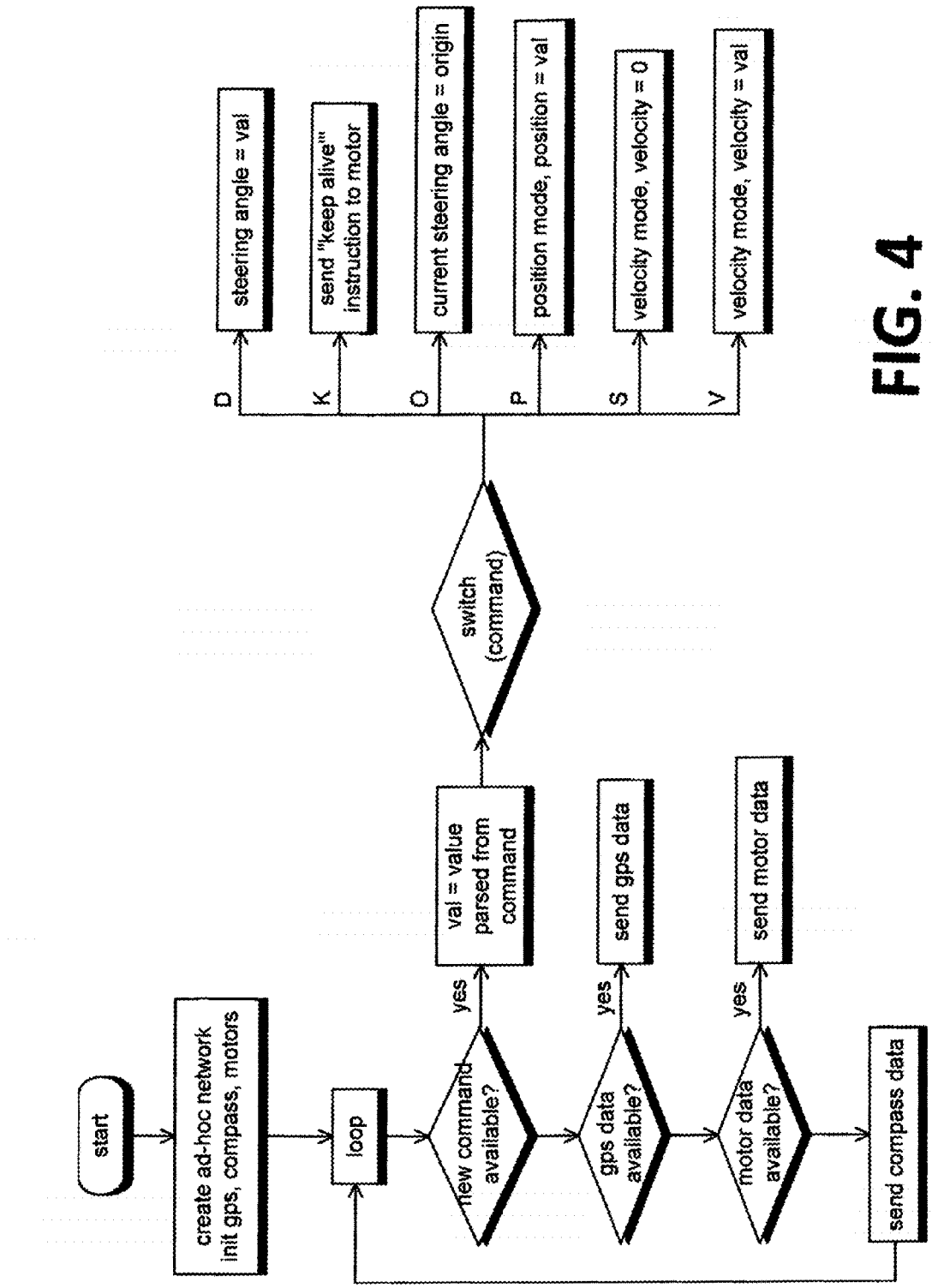
FIG. 4 shows a preferred microcontroller programming flowchart.

FIG. 4 shows a preferred flowchart 11 outlining programming utilized to program microcontroller 5 for the control of vehicle 1. As is clearly shown by flowchart 11, microcontroller 5 is programmed to receive sensor inputs from networking module 8, GPS module 9, and accelerator/compass sensor 7. The sensory data is then used to control the steering and drive velocity of vehicle 1.

Smartphone Software Flowchart

Figure 5:
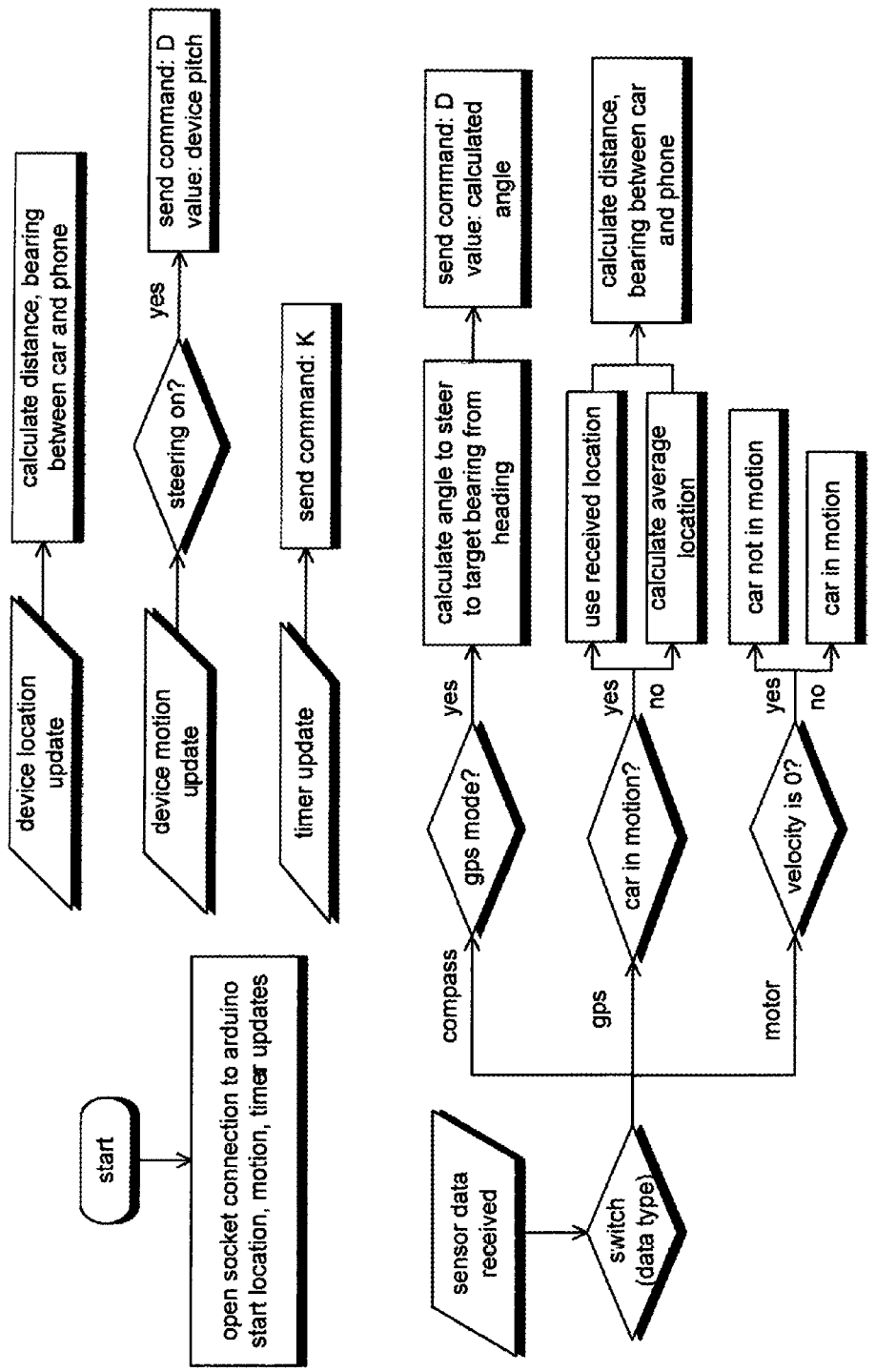
FIG. 5 shows a preferred smartphone programming flowchart.

FIG. 5 shows a preferred flowchart 12 outlining programming utilized to program smartphone 10 for the control of vehicle 1. In a preferred embodiment control software is downloaded to smartphone 10 via a computer network. For example, in one preferred embodiment the control software is an application that is downloaded via the Internet and installed on smartphone 10. After the programming shown outlined in FIG. 5 is installed on smartphone 10, smartphone 10 can be utilized to control vehicle 1 as described above.

Following are the general steps Applicants took to develop the iPhone application:

Applicants developed the iPhone application using the iOS SDK (iPhone Operating System Software Development Kit).

Applicants used the built-in iOS SDK tools for capturing accelerometer data, GPS coordinates as well as the SDK's WiFi communication libraries.

Applicants uses tilt detection from the accelerometer data to determine if the user is tilting the iPhone for steering purposes.

Applicants uses the GPS data from the iPhone in conjunction with the data coming from the micro-controller and associated sensors (i.e. compass, accelerometers, GPS) to calculate a trajectory (direction and distance) between the micro-controller and the iPhone.

The application can be used to control a vehicle in multiple ways.
1) Manual steering by slider-bar control (touch activated)
2) Manual steering by iPhone tilt (accelerometer activated)
3) Automatic steering by GPS and compass guided path

Preferred Smartphone User Interfaces

FIGS. 6-8 show preferred smartphone user interfaces display screens. FIG. 6 shows a preferred smartphone screen that allows the user to calibrate the position of vehicle 1. FIG. 7 shows a preferred smartphone screen that allows the user to receive and process sensor data from networking module 8, GPS module 9, and accelerator/compass sensor 7. FIG. 8 shows a preferred smartphone screen that allows the user to drive and steer vehicle 1.

FIG. 9 shows a preferred user interface flowchart outlining programming utilized for the display screens shown in FIGS. 6-8.

Features of a Preferred Embodiment of The Present Invention

As discussed above, vehicle 1 is preferably manually controlled over an ad hoc WiFi network with a smartphone. GPS and magnetometer data are used to move vehicle 1 to the general location of the connected iPhone, but this function is not very precise due to the inaccuracy of GPS data. Vehicle 1 will preferably stop whenever communication is lost between any of the components (the smartphone, Arduino® microcontroller, and the servo controller steering and drive motors).

It is also possible to utilize a second Arduino® microcontroller with GPS in a known, fixed location used to calculate the error in the GPS satellite signals. In another preferred embodiment, sensor data is integrated utilizing Kalman filter for more accurate location tracking over short distances. A camera could be added to the vehicle with the view from the camera transmitted to the smartphone.

Applicants' Prototypes and Experiments

Applicants reduced to practice the present invention by building and testing the remote control system depicted in FIGS. 1 and 3 through 9 using an approximately 10 inch toy truck as shown in FIG. 1. The system proved to be fully effective. The Applicants also tested most of the features of the present invention using a modified golf cart. In this test Applicants utilized a steering controller described in U.S. patent application Ser. No. 13/754,676 which is incorporated herein by reference. A driver sat in the golf cart to control the speed of the golf cart but the steering was controlled by the present invention.

Preferred Uses of the Present Invention

In one preferred embodiment, smartphone 10 is used to control tractors in the field and to view the status of tractors in the field and monitor data from their sensors. In this capacity, various automated routines may be selected from smartphone 10. For example, autonomous soil-testing vehicles can be given specific locations to test using the smartphone 10 interface.

In another preferred embodiment smartphone 10 is utilized in place of a dedicated remote to control a ship's automated navigation system. Additionally, to help new boat owners, smartphone 10 can display manual control suggestions, as well as giving tactile feedback by putting a slight force on the physical controls.

In another preferred embodiment smartphone 10 is used to provide an inexpensive method of automating a tournament ski boat's steering, which is required to stay on a laser-calibrated path for the skier being towed to qualify for a world record.

Still another potential market is the control of toy models of a variety of vehicles as suggested in the background section. A similar application could be small surveillance vehicles.

Although the above-preferred embodiments have been described with specificity, persons skilled in this art will recognize that many changes to the specific embodiments disclosed above could be made without departing from the spirit of the invention. For example, although smartphone 10 was described as being an iPhone in one preferred embodiment, it should be understood that a variety of programmable smart intelligent devices could also be substituted (such as the iPad, the iPad Mini, and a variety of programmable cell phones and smartphones, to name just a few). Also, although the Aduino® microcontroller was specifically described, it should be clearly understood that a variety of programmable microcontrollers can be substituted to achieve the same result. Other types of drive motors and steering motors other than servo-controlled motors could be used, such as stepper motors and microcontroller controlled motors. Therefore, the attached claims and their legal equivalents should determine the scope of the invention.

What is claimed is:

1. A remote control system for controlling a vehicle with a smart phone comprising:
   A) a smart phone programmed with an application enabling an operator of the smart phone to communicate with a programmable microcontroller located on the vehicle to:
      1) receive sensor data from the programmable microcontroller defining speed and steering direction of the vehicle and
      2) transmit control signals to the programmable microcontroller for controlling the speed and steering direction of the vehicle,
   B) a vehicle comprising:
      1) a radio antenna adapted for radio communication with the smart phone,
      2) compass unit
      3) a GPS unit
      4) an electric power source,
      5) a servo controlled drive motor
      6) a servo controlled steering motor,
      7) a programmable microcontroller (including sensors) adapted to send control signals to the servo controlled drive motor and the servo controlled steering motor, and
      8) a networking WiFi module and,
      9) an accelerator/compass sensor;
   wherein control software is downloaded via the Internet and installed in the smart phone;
   wherein the programmable microcontroller is programmed to receive sensor inputs from the networking module, the GPS module and the accelerator/compass sensor and sensory data is used to control the steering and drive velocity of the vehicle; and
   wherein the smartphone can then be used to control the vehicle via the steering motor and the drive motor.

2. The remote control system as in claim 1 as in claim 1 wherein the smartphone and the vehicle are adapted for WiFi communication.

3. The remote control system as in claim 1 wherein the smartphone and the vehicle are adapted for GSM network communication.

4. The remote control system as in claim 1 wherein the smart phone is an iPhone.

5. The remote control system as in claim 1 wherein the smartphone is programmed with an application:
   A) using the iOS SDK (iPhone Operating System Software Development Kit);
   B) using the built-in iOS SDK tools for capturing accelerometer data, GPS coordinates as well as the SDK's WiFi communication libraries;
   C) using tilt detection from the accelerometer data to determine if the user is tilting the iPhone for steering purposes;
   D) using the GPS data from the iPhone in conjunction with the data coming from the micro-controller and associated sensors (i.e. compass, accelerometers, GPS) to calculate a trajectory (direction and distance) between the micro-controller and the iPhone.

6. The remote control system as in claim 1 application can be used to control a vehicle in multiple ways;
   A) manual steering by slider-bar control (touch activated),
   B) manual steering by iPhone tilt (accelerometer activated), and
   C) automatic steering by GPS and compass guided path.

7. The remote control system as in claim 1 wherein the remote control system is adapted to control a golf cart.

8. The remote control system as in claim 1 wherein the remote control system is adapted to control a tractor.

9. The remote control system as in claim 8 wherein the tractor is comprised of sensors for monitoring field conditions.

10. The remote control system as in claim 1 wherein the remote control system is adapted to control a ship automated navigation system.

11. The remote control system as in claim 1 wherein the remote control system is used to control a boat steering to maintain the boat on a desired path.

12. The remote control system as in claim 11 where the boat is a ski boat.

13. The remote control system as in claim 1 wherein is the remote control system is adapted to control a toy vehicle.

14. The remote control system as in claim 1 wherein the steering motor and the drive motor are microcontroller controlled motors.

* * * * *